US009298689B2

(12) United States Patent
Chang et al.

(10) Patent No.: US 9,298,689 B2
(45) Date of Patent: Mar. 29, 2016

(54) MULTIPLE TEMPLATE BASED SEARCH FUNCTION

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/875,705

(22) Filed: May 2, 2013

(65) Prior Publication Data

US 2014/0331127 A1  Nov. 6, 2014

(51) Int. Cl.
G06F 17/00 (2006.01)
G06F 17/24 (2006.01)
G06F 17/27 (2006.01)
G06F 17/21 (2006.01)
G06F 9/54 (2006.01)

(52) U.S. Cl.
CPC .............. *G06F 17/248* (2013.01); *G06F 9/543* (2013.01); *G06F 17/211* (2013.01); *G06F 17/24* (2013.01)

(58) Field of Classification Search
CPC ................... G06F 17/30864; G06F 17/30867; G06F 17/30389; G06F 17/30637; G06F 17/30967; G06F 17/3043; G06F 17/30448
See application file for complete search history.

(56) References Cited

U.S. PATENT DOCUMENTS

| 5,999,938 | A | 12/1999 | Bliss et al. |
| 6,309,305 | B1 | 10/2001 | Kraft |
| 6,499,041 | B1 | 12/2002 | Breslau et al. |
| 7,562,088 | B2 | 7/2009 | Daga et al. |
| 7,908,564 | B2 | 3/2011 | Hara et al. |
| 8,020,112 | B2 | 9/2011 | Ozzie et al. |
| 8,171,390 | B1 | 5/2012 | Channakeshava |
| 2002/0099685 | A1* | 7/2002 | Takano ............ G06F 17/30011 |
| 2002/0143524 | A1* | 10/2002 | O'Neil et al. .................... 704/9 |
| 2004/0215612 | A1* | 10/2004 | Brody ................................ 707/3 |
| 2006/0195421 | A1* | 8/2006 | Kilroy ............................... 707/3 |
| 2007/0226246 | A1 | 9/2007 | Dheap et al. |
| 2007/0233692 | A1* | 10/2007 | Lisa ................ G06F 17/30651 |
| 2008/0295013 | A1 | 11/2008 | Evans et al. |
| 2009/0235280 | A1 | 9/2009 | Tannier et al. |
| 2010/0050101 | A1 | 2/2010 | Baik et al. |
| 2011/0047506 | A1 | 2/2011 | Miller |
| 2011/0126092 | A1 | 5/2011 | Harris |
| 2013/0205187 | A1* | 8/2013 | Hawkins ...................... 715/208 |

OTHER PUBLICATIONS

Culibrary, "Basic searching in ProQuest Central," Jul. 29, 2011, youtube.com, pp. 1-13.*

(Continued)

*Primary Examiner* — Kavita Padmanabhan
*Assistant Examiner* — Ariel Mercado
(74) *Attorney, Agent, or Firm* — Jason H. Sosa; William H. Hartwell

(57) ABSTRACT

The computer transforms text by receiving a command to insert text into a user interface of an application. The computer extracts one or more words from the text, wherein each of the one or more words is associated with a category relevant to the application. The computer transforms the text to fit a template based on the respective associated categories of the one or more words. The computer inserts the transformed text into the user interface.

17 Claims, 5 Drawing Sheets

(56) References Cited

OTHER PUBLICATIONS

Kalaivani et al., "Methodology for Converting Question to Query Form in Question Answering for Automatic Learning System", European Journal of Scientific Research, ISSN 1450-216X vol. 74 No. 4 (2012), pp. 583-590 Copyright EuroJournals Publishing, Inc. 2012, <http://www.europeanjournalofscientificresearch.com/ISSUES/EJSR_74_4_11.pdf>.

Kruk et al., "Search Interface Based On Natural Language Query Templates", (2006), In Proceedings of the poster session of IADIS International Conference WWW/Internet, <http://citeseerx.ist.psu.edu/viewdoc/summary?doi=10.1.1.154.8886>.

Stylos et al., "Citrine: Providing Intelligent Copy-and-Paste", ACM Symposium on User Interface Software and Technology, UIST'04, Oct. 24-27, 2004, Santa Fe, New Mexico, USA, Copyright 2004 ACM 1-58113-957-8/04/0010, <http://www.cs.cmu.edu/~citrine/CitrinePaper.pdf>.

Noy et al., "Ontology Development 101: A Guide to Creating Your First Ontology". Stanford Knowledge Systems Laboratory Technical Report KSL-01-05 and Stanford Medical Informatics Technical Report SMI-2001-0880, Mar. 2001.

Freepatentsonline.com, "FPO IP Research & Communities", Jan. 12, 2013. <http://www.freepatentsonline.com/search.html>.

"Paste Special—PowerPoint—Office.com", Jan. 19, 2013. Internet Archive WayBackMachine. <http://office.microsoft.com/en-us/powerpoint-help/paste-special-HP010117115.aspx>.

\* cited by examiner

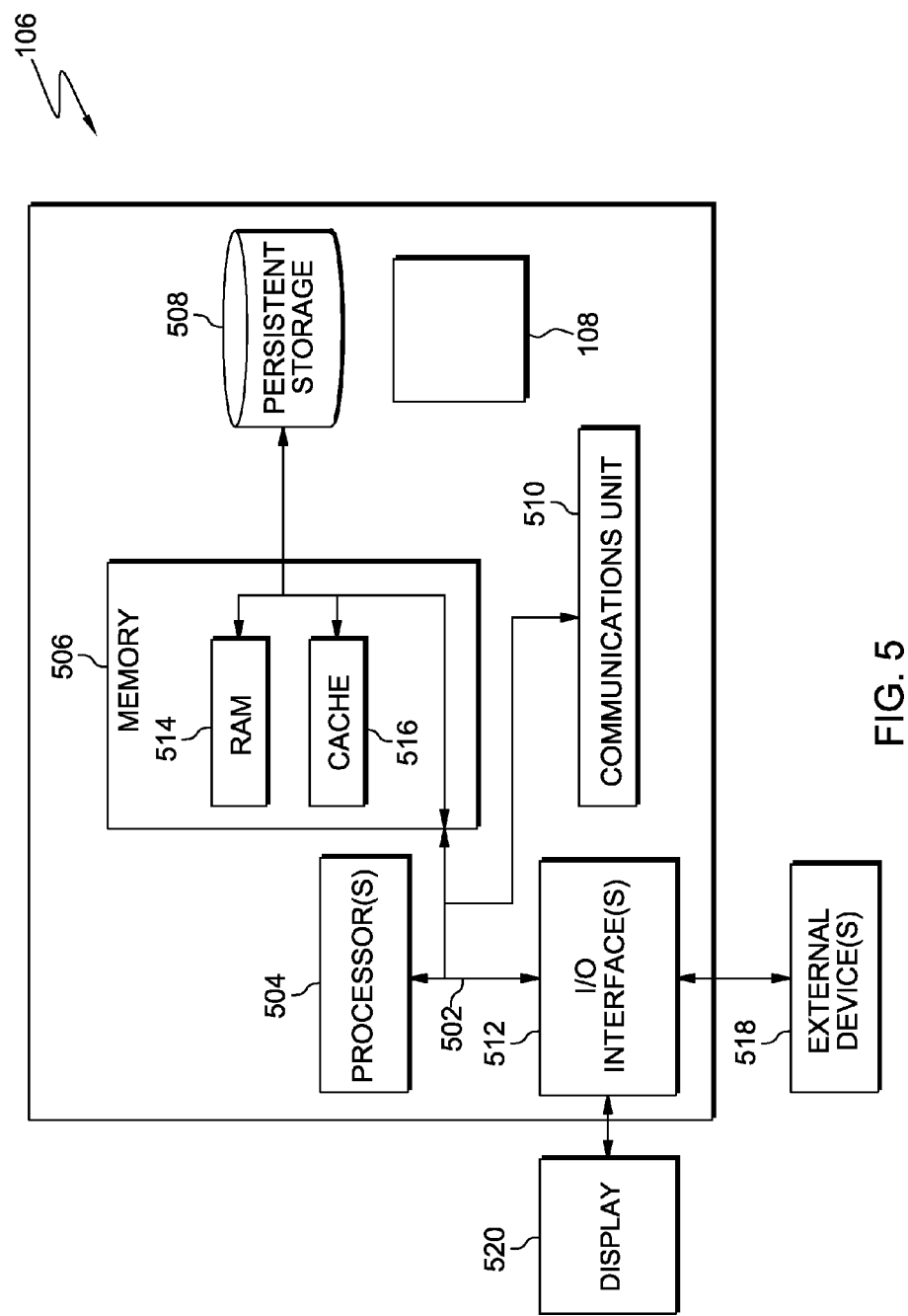

MULTIPLE TEMPLATE BASED SEARCH FUNCTION

FIELD OF THE INVENTION

The present invention relates generally to the field of formatting text, and more particularly to altering text to be pasted into a user interface based on context.

BACKGROUND OF THE INVENTION

A user interface, as used herein, is the interface between a user and a computer program, providing output to a user, typically as graphical, textual, and/or auditory information, and receiving input from a user, for example text, keystrokes from a keyboard, movements from a mouse, and selections (e.g., from a mouse or touchscreen). UIs may be text-based (e.g., command line interfaces), graphical (GUIs), or web-based (WUIs). A GUI accepts input via devices such as a computer keyboard and mouse and provides articulated graphical output on a computer monitor. A WUI accepts input and provides output by generating web pages which are transmitted via the Internet and viewed by a user using a web browser program. While some user interfaces will accept text in any form, other user interfaces require text to be entered according to a particular form to accurately perform a desired function. This is especially true for advanced searching programs, which often require special terms, arrangement of text, and connectors to locate desired information.

Copy and paste functionality allows content to be copied from one location and transferred identically to another. Specifically, "copy" and "paste" are related commands that offer a user interface interaction technique for transferring text, data, files, or objects from a source to a destination. The copy command creates a duplicate of selected data and places it in an area of memory referred to as a "clipboard." The data in the clipboard may later be inserted in a position where the paste command is issued. A user may select a location for insertion by some method, typically by clicking at the desired insertion point. The paste command visibly inserts the clipboard data at the insertion point. Copy and paste functionality typically takes place in graphical user interface systems.

SUMMARY

Embodiments of the present invention disclose a method, computer program product, and computer system for transforming text, the method comprising the steps of, receiving a command to insert text into a user interface of an application. Extracting one or more words from the text, wherein each of the one or more words is associated with a category relevant to the application. Transforming the text to fit a template based on the respective associated categories of the one or more words. Inserting the transformed text into the user interface.

BRIEF DESCRIPTION OF THE SEVERAL VIEWS OF THE DRAWINGS

FIG. 5 depicts a block diagram of components of the computer device executing the copy and paste template program, in accordance with an embodiment of the present invention.

DETAILED DESCRIPTION

Figure 1:
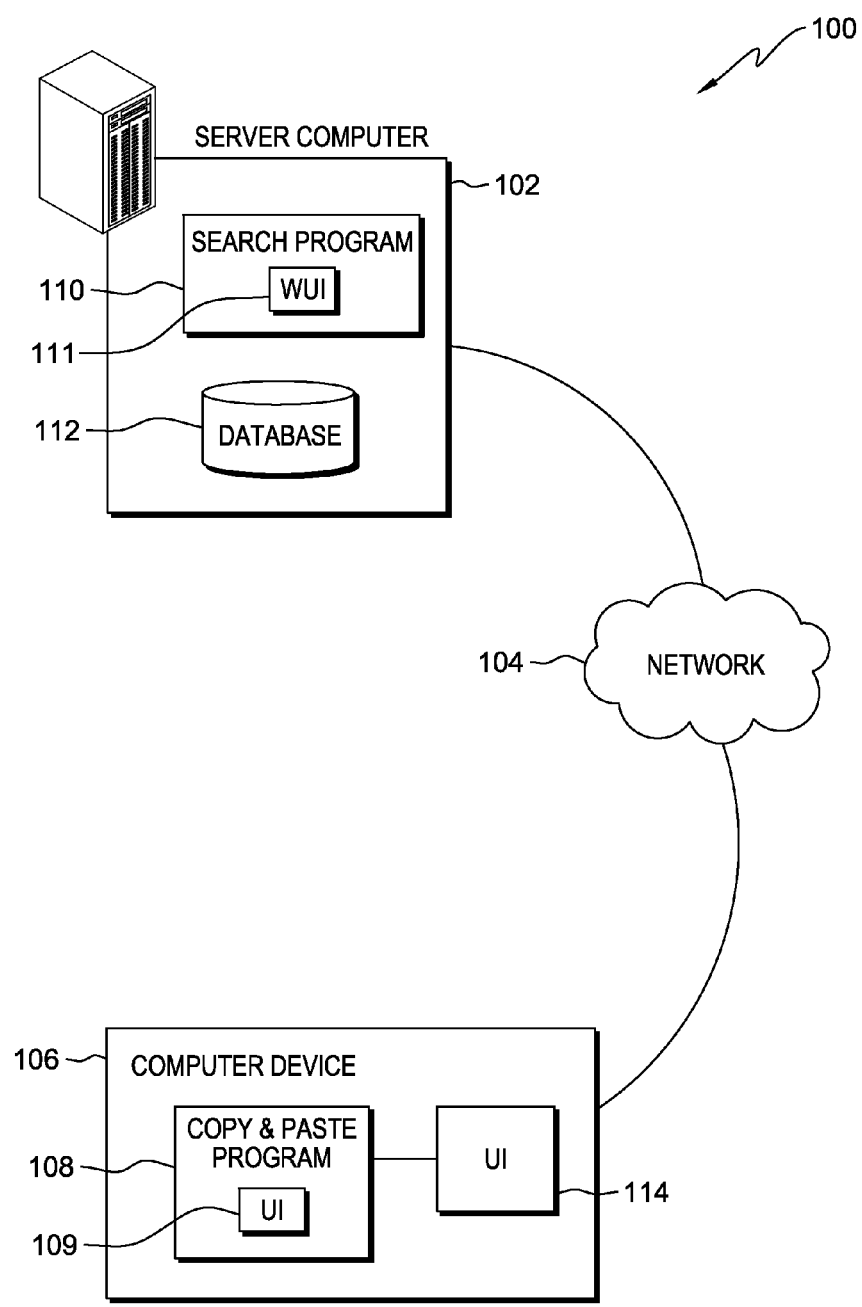
FIG. 1 is a functional block diagram illustrating a distributed data processing environment, in accordance with an embodiment of the present invention.

Embodiments of the present invention recognize that while the standard copy and paste functionality allows for convenient reproduction of text from one user interface to another, it does not account for particular form required by a receiving user interface. Take, for example, a specialized search application requiring search terms to be entered in a specific format. A segment of text, e.g., from an online article, may contain a user's desired search terms and may be copied and pasted into the search application's user interface. The user may then alter the text within the user interface to remove words of little importance and/or to place in a form specific to the search application.

Embodiments of the present invention enhance the copy and paste functionality by providing the ability to identify one or more template formats corresponding to a particular application and fitting the copied text to one of the templates using ontological processes (e.g., categorizing key words and matching to placeholders within a template). The formatted text may then be pasted into a user interface corresponding to the particular application in the correct form. Exemplary implementations of such embodiments are described below with reference to the figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 includes server computer 102 and computer device 106 interconnected over network 104.

In general, network 104 can be any combination of connections and protocols that will support communications between server computer 102 and computer device 106. Network 104 can include, for example, a local area network (LAN), a wide area network (WAN) such as the internet, a cellular network, or any combination of the preceding, and can further include wired, wireless, and/or fiber optic connections.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 104, as is common in data centers and with cloud computing applications. In general, server computer 102 is representative of any programmable electronic device or combination of programmable electronic devices capable of executing machine-readable program instructions and communicating with other computing devices via a network.

As depicted, server computer 102 represents a web server hosting search program 110. Search program 110 represents a web-based searching application, e.g., a patent search website or legal search website, and can accept search terms and respond with search results via WUI 111. In one implementation, search program 110 may search for and store records in local database 112. In another implementation, search program 110 may search one or more external databases or computers (not shown).

In various embodiments of the present invention, computer device 106 can be a laptop computer, a tablet computer, a netbook computer, a personal computer (PC), a desktop computer, a personal digital assistant (PDA), a smartphone, or any programmable electronic device capable of communicating with server computer 102 via network 104. Exemplary components of computer device 106 are described in greater detail with regard to FIG. 5.

Computer device 106 contains copy and paste template program 108. Copy and paste template program 108 allows for copied content to be altered according to a template format. Templates for a specific application may be predefined, located online, or may be previously established by a user of copy and paste template program 108. Based on the specific application to which text is being pasted, copy and paste template program 108 can display a plurality of templates to which copied content can be altered to fit. In various embodiments, the specific application can be identified by a URL of a website hosting the application, the name of the website, or content and/or appearance of the user interface. Copy and paste template program 108 can identify and extract key words from the copied content and fit the extracted keywords to a selected template. Templates and key word lists and associations can be stored locally or in network storage. The altered (or formatted) form of the copied content may subsequently be pasted into a selected location.

Copy and paste template program 108 includes, in one embodiment, UI 109 for displaying relevant templates to a user and receiving a selection from the user. Additionally, copy and paste template program 108 may communicate with UI 114, which may be a web browser interface, to access and interact with websites and web-based applications (e.g., search program 110 on server computer 102).

As an example of use within data processing environment 100, copy and paste template program 108 may copy text that a user selects to use as the basis of a search in search program 110. As the user directs the text to be pasted into WUI 111, copy and paste program 108 identifies search program 110 and one or more templates corresponding to a proper format for search program 110. Copy and paste program 108 identifies key words in the text and based on categorization of each keyword, fits them to at least one of the templates. If multiple templates exist corresponding to search program 110, a user may select a desired template from the plurality of templates. The altered text is pasted into WUI 111 and a search may be performed.

Figure 2:
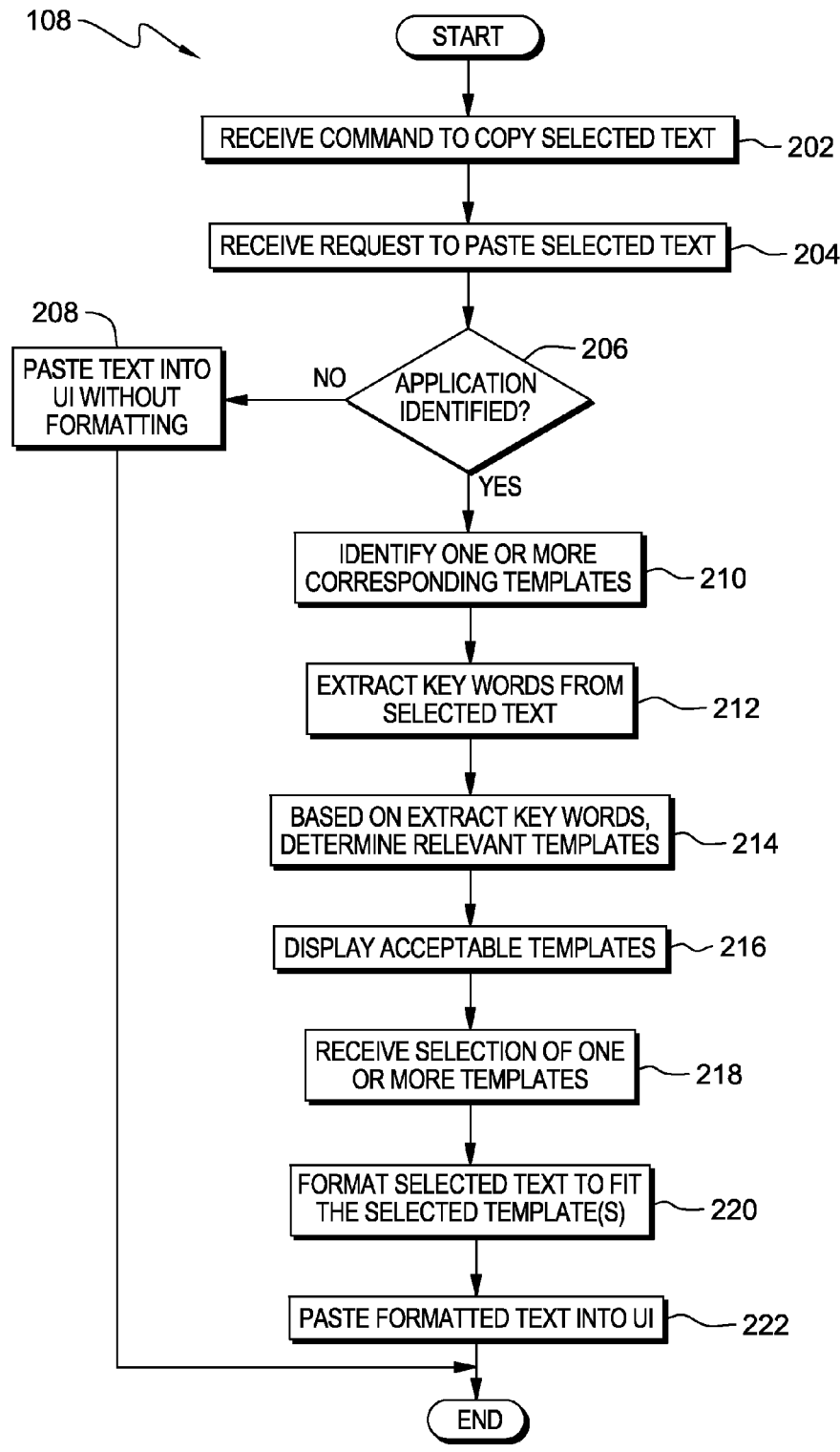
FIG. 2 is a flowchart depicting operational steps of one exemplary implementation of a copy and paste template program, in accordance with an embodiment of the present invention.

FIG. 2 is a flowchart depicting operational steps of one exemplary implementation of copy and paste template program 108, in accordance with an embodiment of the present invention.

Copy and paste template program 108 receives a command to copy selected text (e.g. a user may highlight desired text and select a "copy" instruction), and places the selected text on the clipboard (step 202). The selected text can be a compilation of words or can be in the form of complete sentences.

Copy and paste template program 108 receives a subsequent request to paste the selected text into a user interface of an application (step 204) and attempts to identify the application (decision 206). In one embodiment, the identity of the website hosting the application may be used to identify the application. For example, if copy and paste template program 108 attempted to paste text into WUI 111 of search program 110, the text would ultimately be routed to a URL identifying server computer 102. Prior to completing the paste operation, copy and paste template program 108 may identify the URL and/or the corresponding website name. In an alternate embodiment, copy and paste template program 108 may compare the appearance of WUI 111 to a database of known UIs and upon finding a match, identify an application corresponding to the known UI. In yet another embodiment, copy and paste template program 108 may gather content of the UI, for example, words displayed in the UI, associated tags, etc., and determine if the content matches content corresponding to known applications. For example, some application interfaces display the name of the application.

If copy and paste template program 108 could not identify the application (no branch, decision 206), copy and paste template program 108 pastes the text into the user interface without formatting (step 208). If, however, copy and paste template program 108 does identify the application (yes branch, decision 206), copy and paste template program 108 identifies templates corresponding to the application (step 210). In one embodiment, copy and paste template program 108 may access a local database storing known applications and corresponding templates. In another embodiment, copy and paste template program 108 may access an online database of applications and corresponding templates. The templates may, in one embodiment, be predefined for specific applications. As an alternative, or in addition, to predefined templates, a user may create one or more templates for a specific application (or website if, for example, applications are identified by the identity of a hosting website). Each template comprises an acceptable form for text to be entered into a user interface of the specific application (e.g., one or more search query formats), and one or more placeholders to be replaced by corresponding terms. Ideally, each placeholder is associated with a category or type of information. Categories may be generic descriptions, e.g., "first name," "last name", or may be specific to the application, e.g., "inventor_name," "assignee_name").

Copy and paste template program 108 extracts key words from the selected text (step 212), preferably based on the categories corresponding to the identified templates. Since the selected text can be a compilation of words or can be in the form of complete sentences, the selected text can be grammatically broken down, for example, through parsing.

In various embodiments of the present invention, a user can program key word lists into copy and paste template program 108 prior to the program extracting key words. Each key word may be associated with one or more categories. Again, categories may be generic descriptions for a type of word ("first name"), and each category may correspond to a list acceptable words. Other categories, and corresponding words, may be directly associated with a specific application. The key word lists can be used to limit the amount of words extracted from the selected text. Take, for example, a search being performed in the field of patents to locate a patent in a database. Categories identified from templates for the patent search application might include inventors' names, companies and/or technologic terminology; and each category may correspond to a list of acceptable words or terms falling within the category. Copy and paste template program 108 may extract only words and terms from the selected text that fall into one of the categories.

In one embodiment, the user can update a key word list by manually adding key words which previously did not exist on the key word list. In another embodiment, copy and paste template program 108 may periodically search a database corresponding to the application for new records, and search of associations between words in the new records and established categories. New words or terms found may be added to the proper category list. Using the patent searching example, a patent contains an "inventor" field and lists inventor names. Any identified inventor names that did not previously exist in the list corresponding to an existing "inventor name" category could be added to the list.

Based on associated categories of the extracted key words, copy and paste template program 108 determines templates in which the extracted key words can fit (step 214). As previously discussed, each template contains one or more placeholders corresponding to a category. If each placeholder of a template can be replaced by a key word matching the category, the format of the template is an acceptable choice for the selected text.

Copy and paste template program 108 may display acceptable templates to a user (step 216) and receives a selection from the user of a desired template or templates (step 218). Templates may be displayed in their original form (with placeholders), or, in another embodiment may be displayed as they would look with the key words inserted. Templates may also be expandable or combined to include every key word matching a relevant category. For example, for every key word identified, a relevant template format may be found, and each template may be combined with "AND"s and "OR"s such that all key words are included. In an embodiment where only one acceptable template is identified, copy and paste template program 108 may automatically select the acceptable template as the template for use.

Upon selection of a template or templates, the selected text is formatted to fit the selection (step 220). Copy and paste template program 108 pastes the formatted text into the user interface of the application (step 222).

Once displayed in the user interface, the user has the ability to alter the form, if desired, and/or proceed with the search. For example, the user can alter the displayed template by moving the extracted keywords to a different position from the one used by the selected template. Though the templates are previously established by the user, specific unforeseen instances may arise where the user may want to alter the template to better suit the search being performed.

In an alternate implementation, the functionality described above may be performed by the application receiving copied text. This may simplify operations, because the application would not have to identify itself, nor would it be required to maintain templates for multiple applications. The application may maintain its own list of templates and key words, and upon receiving selected text to be inserted, could, in one embodiment, begin the process from step 212, extracting key words from the text and fitting them to one or more templates.

Figure 3A:
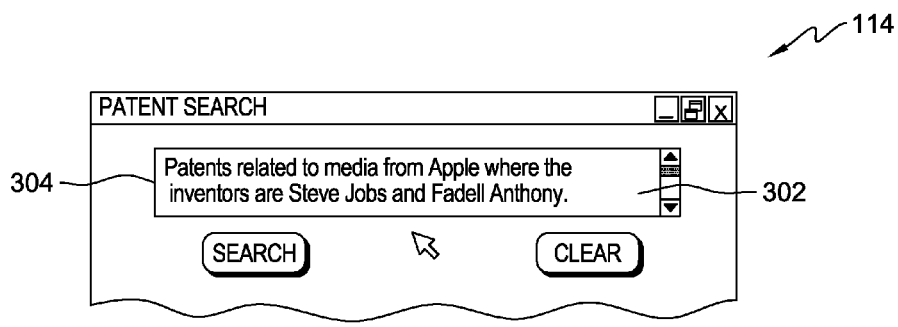
FIG. 3a is a user interface of a hypothetical scenario of the copy and paste template program of FIG. 2, with received selected text previously copied from another location, in accordance with an embodiment of the present invention.
Figure 3B:
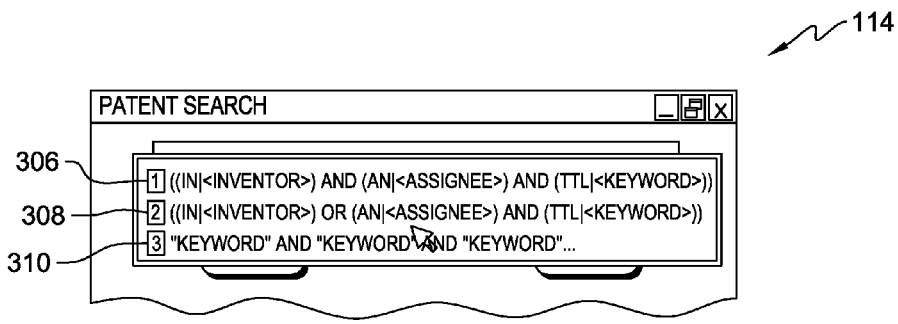
FIG. 3b is the user interface of the hypothetical scenario of copy and paste template program with displayed templates for extracted keywords based on identified categories, in accordance with an embodiment of the present invention.
Figure 3C:
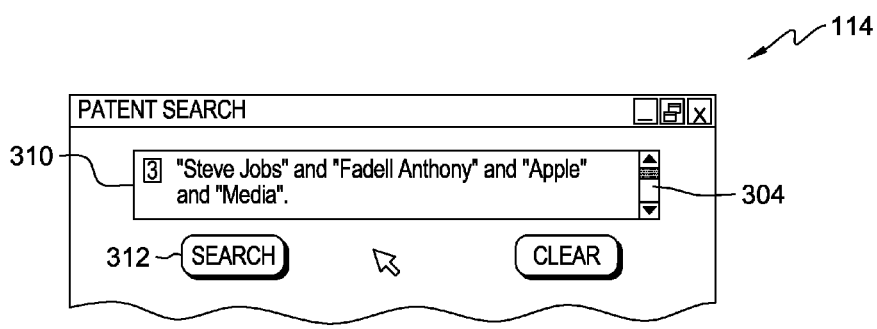
FIG. 3c is the user interface of the hypothetical scenario of copy and paste template program with the displayed extracted keywords according to a selected template, in accordance with an embodiment of the present invention.

FIGS. 3*a*, 3*b*, and 3*c* are user interface displays of a hypothetical scenario of the copy and paste template program 108, in accordance with an exemplary embodiment of the invention.

As illustrated in FIG. 3*a*, copy and paste template program 108 receives selected text 302, which can be copied from a location such as an online news or journal article, and pasted in search tab 304 of UI 114. In this example, search tab 304 is used to search a database containing patent applications. Once selected text 302 is pasted in search tab 304, copy and paste template program 108 parses and extracts keywords from selected text 302. In this example, search tab 304 pertains to searching a patent database, and the extracted keywords can consist of names, companies, and technology fields.

As discussed with reference to FIG. 2, corresponding categories are determined for each of the extracted keywords. Since search tab 304 is associated with a patent database, the categories are accordingly associated with patents. In this example, names are associated with the category "inventors", companies are associated with the category "assignee", and technology fields are associated with the category "title name." Once the categories are identified for the extracted keywords, a template can be presented on UI 114 for the user to select. The presented template contains search options for searching the patent database, for example, a search using only one identified category, or a search using all identified categories. Based on user preferences, the presented template may show a preferred searching method of the patent database for the selected text 302 pasted in search tab 304.

As illustrated in FIG. 3*b*, copy and paste template program 108 displays templates of the extracted keywords based on the identified categories. In this example, three templates are presented for the user to select. The templates are according to the user's preference and search methods. In this example, if template 306 is selected, the search will consist of both "inventors" from selected text 302. If template 308 is selected, the search can consist of either one of the "inventors" from selected text 302. Once the user selects a template, the template with the categorized extracted words can be displayed.

As illustrated in FIG. 3*c*, copy and paste template program 108 displays the extracted keywords according to the selected template. The selected text 302 now appears as template text 310 in search tab 304. The user has the ability to adjust template text 310 or the user can proceed with the search of the patent database by selecting search button 312.

Figure 4:
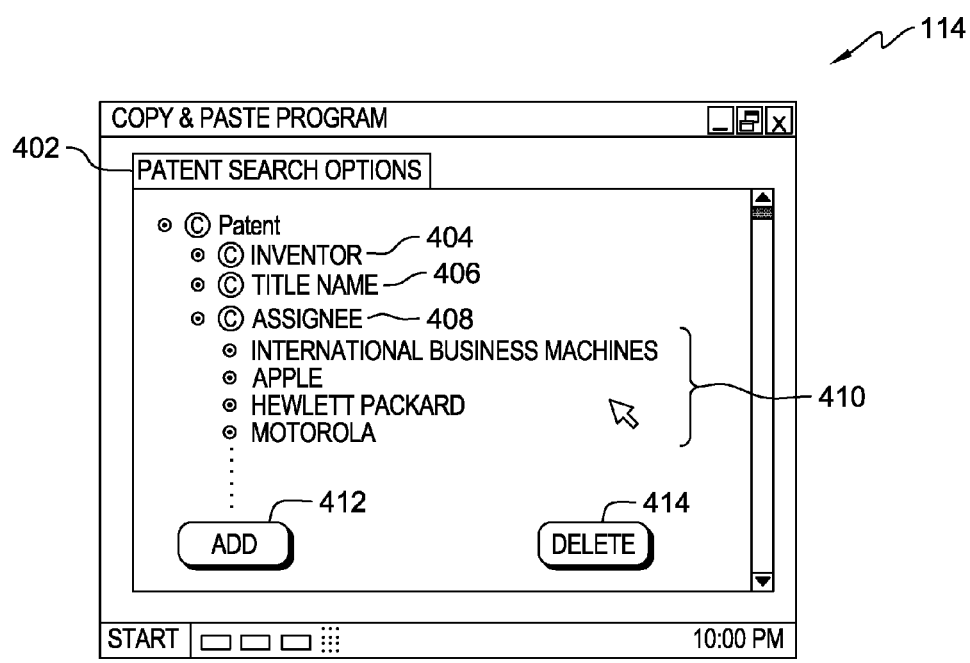
FIG. 4 is a user interface display of search options of the hypothetical scenario of copy and paste template program, in accordance with the embodiment of FIGS. 3a, 3b, and 3c.

FIG. 4 is a user interface display of search options of the hypothetical scenario of copy and paste template program 108, in accordance with the embodiment of FIGS. 3*a*, 3*b*, and 3*c*.

User interface 114 displays patent search options 402 which include a keyword list 410 and corresponding categories 404, 406, and 408 for each of the keywords copy and paste template program 108 can use. Keyword list 410 is viewable on user interface 114, for example, when they are expanded from a category. Assignee 408 is the category expanded in user interface 114 for a user to view, as well as add or delete, a keyword from keyword list 410. The user can add a keyword to keyword list 410 by selecting add button 412, which can open a window prompting for the keyword to be entered. The user can also delete a keyword from keyword list 410 by selecting delete button 414, which can open a window prompting for the keyword to be removed. Add button 412 and delete button 414 can also be used to add or delete categories, such as inventor 404 and title name 406. In this example, copy and paste template program 108 uses the keyword list 410 to extract keywords from the selected text copied to a patent search engine.

FIG. 5 depicts a block diagram of components of computer device 106 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer device 106 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Copy and paste template program 108 is stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

In these examples, communications unit 510 includes one or more network interface cards. Communications unit 510 may provide communications through the use of either or both physical and wireless communications links. Copy and paste template program 108 may be downloaded to persistent storage 508 through communications unit 510.

I/O interface(s) 512 allows for input and output of data with other devices that may be connected to computer device 106. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g copy and paste template program 108 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for transforming text, the method comprising:
receiving a command to insert text into a portion of a user interface for searching content within an application;
extracting one or more words from the text inserted into the portion of the user interface, wherein each of the one or more words is associated with a category relevant to the application;
displaying, in the user interface of the application, two or more templates into which the one or more words can be inserted based on the respective associated categories present in the two or more templates;
receiving a first template selection from the displayed two or more templates from a user;
inserting the one or more extracted words into the first template based on the respective associated categories of the one or more words;
removing the text inserted into the portion of the user interface for searching content within the application; and
inserting the first template with the inserted one or more extracted words into the portion of the user interface for searching content within the application.

2. The method of claim 1, further comprising:
identifying, by one or more computer processors, the application; and
based on the identification of the application, identifying, by one or more computer processors, two or more templates corresponding to a proper format for text to be entered into the identified application.

3. The method of claim 2, wherein the two or more templates each contain at least one place holder for replacement with subsequently selected text, and wherein each place holder corresponds to a predefined category relevant to the application.

4. The method of claim 3, wherein extracting the one or more words from the text inserted into the portion of the user interface comprises:
determining, by one or more computer processors, one or more categories relevant to the application based on place holders within the two or more templates;
for each determined category of the one or more categories, determining, by one or more computer processors, a list of one or more predefined words, terms, or phrases that fall within the determined category; and
locating, by one or more computer processors, words within the text that match words from the respective lists determined for the one or more categories.

5. The method of claim 1, further comprising:
displaying two or more templates to which the one or more words can fit based on the respective associated categories of the one or more words; and
receiving a selection of two or more templates from the displayed two or more templates from a user.

6. The method of claim 1, further comprising:
prior to receiving the command to insert text into a portion of the user interface for searching content within the application, receiving a command to copy the text from a different location, and storing the text in an area of memory for subsequent insertion into a user interface.

7. A computer program product for transforming text, the computer program product comprising:
one or more non-transitory computer readable storage media and program instructions stored on the one or more non-transitory computer readable storage media, the program instructions comprising:
program instructions to receive a command to insert text into a portion of a user interface for searching content within an application;
program instructions to extract one or more words from the text inserted into the portion of the user interface, wherein each of the one or more words is associated with a category relevant to the application;
program instructions to display, in the user interface of the application, two or more templates into which the one or more words can be inserted based on the respective associated categories present in the two or more templates;
program instructions to receive a first template selection from the displayed two or more templates from a user;
program instructions to insert the one or more extracted words into the first template based on the respective associated categories of the one or more words;
program instructions to remove the text inserted into the portion of the user interface for searching content within the application; and
program instructions to insert the first template with the inserted one or more extracted words into the portion of the user interface for searching content within the application.

8. The computer program product of claim 7, further comprising program instructions, stored on the one or more non-transitory computer readable storage media, which when executed by a processor, cause the processor to:
   identify the application; and
   based on the identification of the application, identify two or more templates corresponding to a proper format for text to be entered into the identified application.

9. The computer program product of claim 8, wherein the two or more templates each contain at least one place holder for replacement with subsequently selected text, and wherein each place holder corresponds to a predefined category relevant to the application.

10. The computer program product of claim 9, wherein the program instructions to extract the one or more words from the text inserted into the portion of the user interface comprise program instructions, stored on the one or more non-transitory computer readable storage media, which when executed by a processor, cause the processor to:
   determine one or more categories relevant to the application based on place holders within the two or more templates;
   for each determined category of the one or more categories, determine a list of one or more predefined words, terms, or phrases that fall within the determined category; and
   locate words within the text that match words from the respective lists determined for the one or more categories.

11. The computer program product of claim 7, further comprising program instructions, stored on the one or more non-transitory computer readable storage media, which when executed by a processor, cause the processor to:
   display two or more templates to which the one or more words can fit based on the respective associated categories of the one or more words; and
   receive a selection of two or more templates from the displayed two or more templates from a user.

12. The computer program product of claim 7, further comprising program instructions, stored on the one or more non-transitory computer readable storage media, which when executed by a processor, cause the processor to:
   prior to receiving the command to insert text into a portion of the user interface for searching content within the application, receive a command to copy the text from a different location, and storing the text in an area of memory for subsequent insertion into a user interface.

13. A computer system for transforming text, the computer system comprising:
   one or more computer processors;
   one or more computer readable storage media;
   program instructions stored on the one or more computer readable storage media, for execution by at least one of the one or more computer processors, the program instructions comprising:
   program instructions to receive a command to insert text into a portion of a user interface for searching content within an application;
   program instructions to extract one or more words from the text inserted into the portion of the user interface, wherein each of the one or more words is associated with a category relevant to the application;
   program instructions to display, in the user interface of the application, two or more templates into which the one or more words can be inserted based on the respective associated categories present in the two or more templates;
   program instructions to receive a first template selection from the displayed two or more templates from a user;
   program instructions to insert the one or more extracted words into the first template based on the respective associated categories of the one or more words;
   program instructions to remove the text inserted into the portion of the user interface for searching content within the application; and
   program instructions to insert the first template with the inserted one or more extracted words into the portion of the user interface for searching content within the application.

14. The computer system of claim 13, further comprising program instructions, stored on the one or more computer readable storage media, which when executed by a processor, cause the processor to:
   identify the application; and
   based on the identification of the application, identify two or more templates corresponding to a proper format for text to be entered into the identified application.

15. The computer system of claim 14, wherein the two or more templates each contain at least one place holder for replacement with subsequently selected text, and wherein each place holder corresponds to a predefined category relevant to the application.

16. The computer system of claim 15, wherein the program instructions to extract the one or more words from the text inserted into the portion of the user interface comprise program instructions, stored on the one or more computer readable storage media, which when executed by a processor, cause the processor to:
   determine one or more categories relevant to the application based on place holders within the two or more templates;
   for each determined category of the one or more categories, determine a list of one or more predefined words, terms, or phrases that fall within the determined category; and
   locate words within the text that match words from the respective lists determined for the one or more categories.

17. The computer system of claim 13, further comprising program instructions, stored on the one or more computer readable storage media, which when executed by a processor, cause the processor to:
   display two or more templates to which the one or more words can fit based on the respective associated categories of the one or more words; and
   receive a selection of two or more templates from the displayed two or more templates from a user.

\* \* \* \* \*